United States Patent [19]

Aydelette, Sr.

[11] Patent Number: 4,916,845
[45] Date of Patent: Apr. 17, 1990

[54] DEVICE TO ATTRACT FISH

[76] Inventor: Charles B. Aydelette, Sr., Rte. 19, Box 2890, Lexington, N.C. 27292

[21] Appl. No.: 284,600

[22] Filed: Dec. 15, 1988

[51] Int. Cl.⁴ ............................................. A01K 91/00
[52] U.S. Cl. ............................................. 43/4; 119/3
[58] Field of Search .................. 43/2, 4, 42.74, 55; 119/3

[56] References Cited

U.S. PATENT DOCUMENTS

| | | | |
|---|---|---|---|
| 777,382 | 12/1904 | Beau | 43/55 |
| 2,742,730 | 4/1956 | Karr | 43/42.74 |
| 4,471,552 | 9/1984 | McIntosh et al. | 43/4.5 |
| 4,550,518 | 11/1985 | Layson | 43/2 |
| 4,621,448 | 11/1986 | Pennise | 43/42.74 |
| 4,672,764 | 6/1987 | Dempsey | 43/4 |
| 4,727,672 | 3/1988 | Hill et al. | 43/4 |
| 4,736,708 | 4/1988 | Yoder | 119/3 |
| 4,744,331 | 5/1988 | Whiffin | 119/3 |

Primary Examiner—M. Jordan

[57] ABSTRACT

A device for attracting fish in fresh water lakes and ponds is presented and includes one or more disk which are tandemly arranged and are anchored by a tubular transparent anchor which contains bait fish. The disk have a concave configuration and are formed from a floatable plastic. A serrated edge on at least the bottom disk provides a niche for a fishing line to maintain the fishing line bait near the fish which congregate under the disks.

17 Claims, 3 Drawing Sheets

DEVICE TO ATTRACT FISH

BACKGROUND OF THE INVENTION

1. Field Of The Invention

The present invention relates to an artificial shelter to attract fish suitable for submerging in fresh water bodies to provide a bountiful fishing location. A portion of the device includes a container for holding live bait fish and is utilized in several configurations.

2. Description Of The Prior Art And Objectives Of The Invention

Various artificial structures have been devised in the past for fresh water fishing to attract fish such as bass and other species. Some of the devices utilized heretofore include artificial trees such as set forth in U.S. Pat. No. 4,727,672 and U.S. Pat. No. 4,471,552 provides a structure which includes a floatable buoy. Also, some fisherman in the past have cut natural tree limbs or shrubs and placed them at desired locations in lakes and ponds to serve as gathering points and shelters for fish. All such past devices have been employed with varing degrees of success depending on the type of fishing conducted, and the particular conditions encountered. Certain serious drawbacks have resulted for example, in using artificial or natural tree limbs as fishing lines often become enwrapped with the limbs and have to be cut free. Other specific devices which have been used are difficult to retrieve or move as may be desired from time to time or from location to location. Also, artificial devices can be expensive, easily damaged and are therefore little used.

With these problems and disadvantages in mind, the present invention was conceived and one of its objectives is to provide a device which will present fish in ponds and lakes with an attractive gathering site and also will be convenient for the fishermen to exploit.

Another objective to the present invention is to provide a device to attract fish which includes a disk-like member which has an irregular edge to temporarily hold a fishing line thereon.

It is another objective of the present invention to provide a device to attract fish which includes a transparent container for keeping bait fish therein.

It is also an objective of the present invention to provide a device which can be selectively assembled and positioned in either shallow or deep water.

It is still yet another objective of the present invention to provide a device to attract fish which includes a floatable disk which is concave to allow a fisherman to position the device at a specific point on the bottom of a lake by dropping it into the water from a boat, pier or bank.

Other objectives and advantages of the invention will become apparent to those skilled in the art as a more detailed description presented below.

SUMMARY OF THE INVENTION

The invention presented herein consists of a device for attracting fish and includes a tubular container which acts as an anchor to hold the device on the bottom of a lake or pond. The anchor is formed from clear plastic and will hold bait fish such as minnows to increase the attraction of larger game fish such as bass and crappie. One or more floatable concave disks may be joined to the anchor in tandem by a rigid connector which will prevent rotation of the disks by water currents. The lower disk which is generally the largest includes an irregular edge which is notched for receiving fishing lines to thereby hold the fishing line near the bait containing anchor. A floatable buoy can be attached to the upper most disk to identify the location of the device and of course the buoy can be removed and the device left in the water intact once fishing for a time period is completed.

DESCRIPTION OF THE PREFERRED EMBODIMENT

Figures 1, 5:
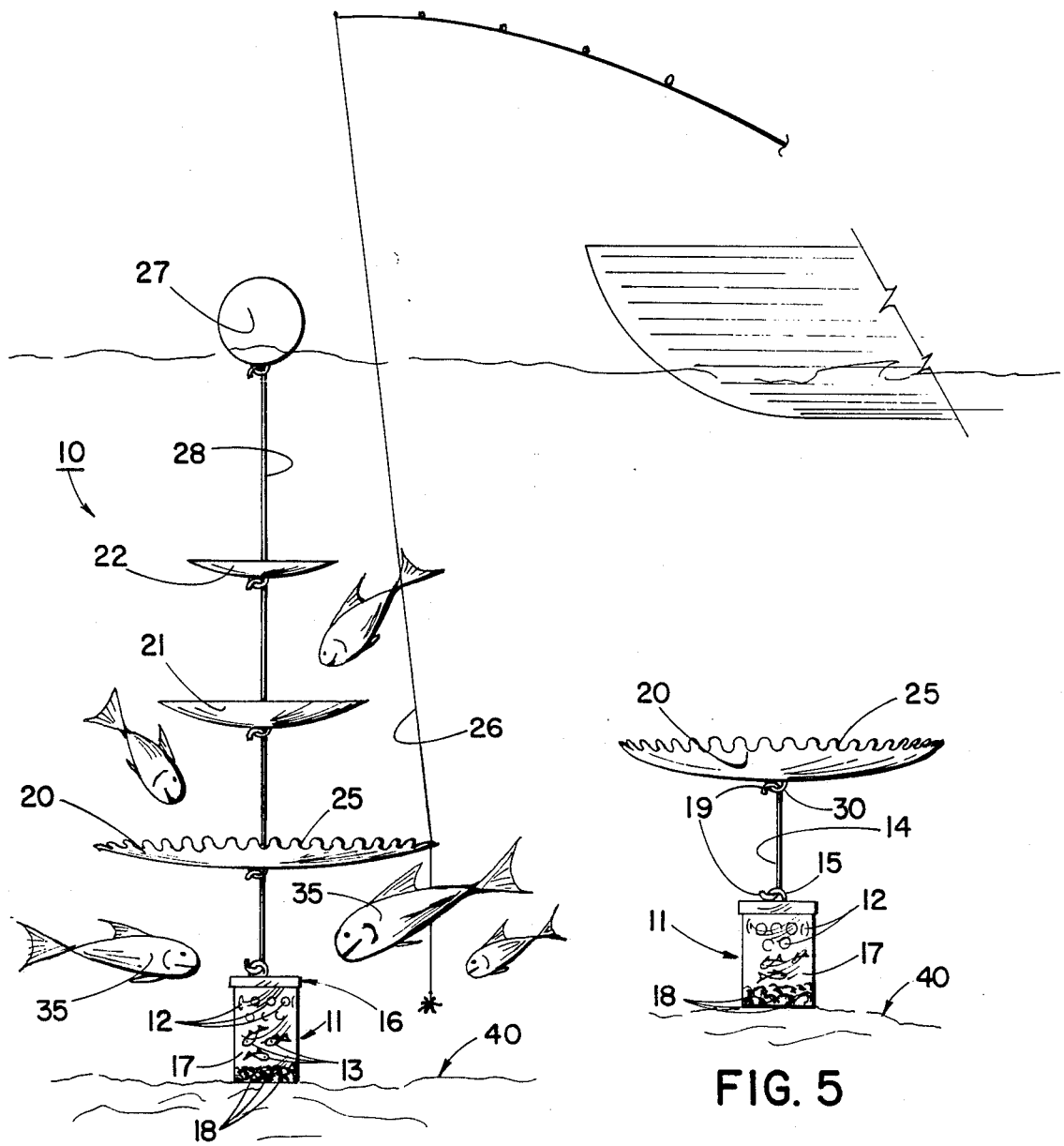
FIG. 1 illustrates a typical configuration of the device for attracting fish utilizing three concave disks with a buoy attached.
FIG. 5 shows yet another embodiment of the invention employing only one disk.

The preferred form of the invention is shown in FIG. 5 whereby a transparent anchor container is provided for holding bait fish such as minnows. The walls of the container define a series of apertures which are too small in diameter to allow the minnows to escape. Ballast is placed in the bottom of the container such as heavy rocks to provide the necessary stability to the device. A rigid connector joins the container to a floatable concave disk which may be 6 feet in diameter formed from a floatable plastic having a density less than water such as polyethylene. The concave configuration allows a fisherman to drop the disk with anchor attached over the side of a boat and the device will pass straight down through the water below where it will rest and be positioned on the lake bottom whereafter the device will begin attracting fish for game purposes. The disk member includes a serrated edge which will catch a fishing line, making the bait thereon very accessible for fish which may gather for shade or feeding purposes under the disk.

DETAILED DESCRIPTION OF THE DRAWINGS AND OPERATION OF THE INVENTION

Figure 3:
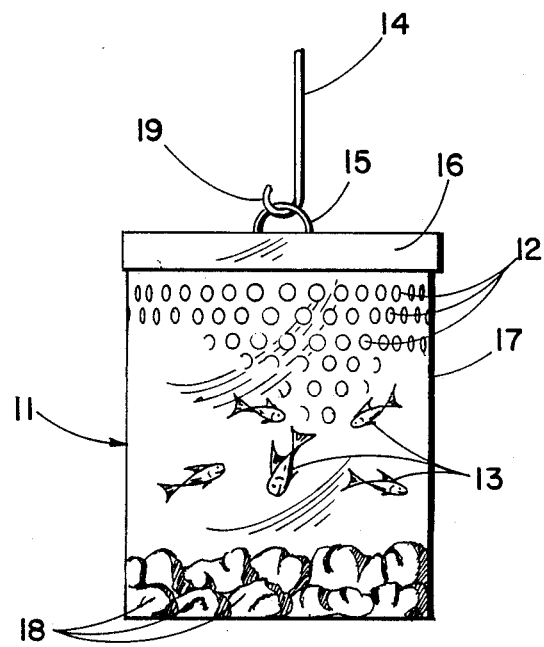
FIG. 3 demonstrates an enlarged view of the anchor and a portion of the rigid connector.
Figure 4:
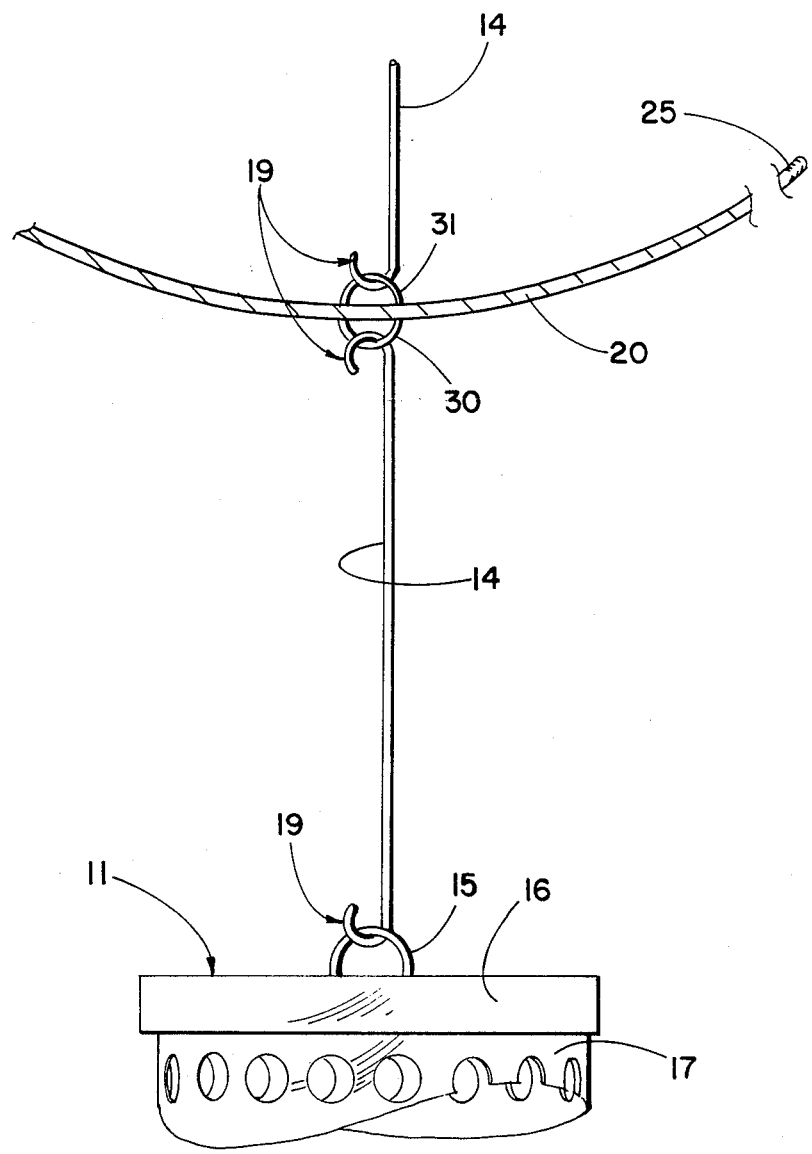
FIG. 4 depicts an enlarged view of a portion of the bottom disk and connector.

Turning now to the drawings, FIG. 1 demonstrates a typical fresh water lake or pond usage of the invention whereby device 10 includes anchor means 11 which consists of a transparent tubular container 17 formed from an acrylic plastic having a plurality of apertures 12 to allow water to pass therethrough. Bait fish 13 are contained within and may be for example minnows or other small fish which will attract larger game fish such as bass. Bait fish 13 are placed in anchor means 11 by removing lid 16 affixed thereon. As seen in FIG. 4, rigid connector 14 comprises a stiff wire having a crook 19 on each end which is passed through lid loop 15. Lid 16 may be threadably attached to tubular member 17, or frictionally fitted thereto and as also shown in FIG. 3, and rocks 18 are positioned inside tubular member 17 and serve to add weight to anchor means 11 to provide device 10 with the necessary stability and resistance to water currents which it may encounter.

Figure 2:
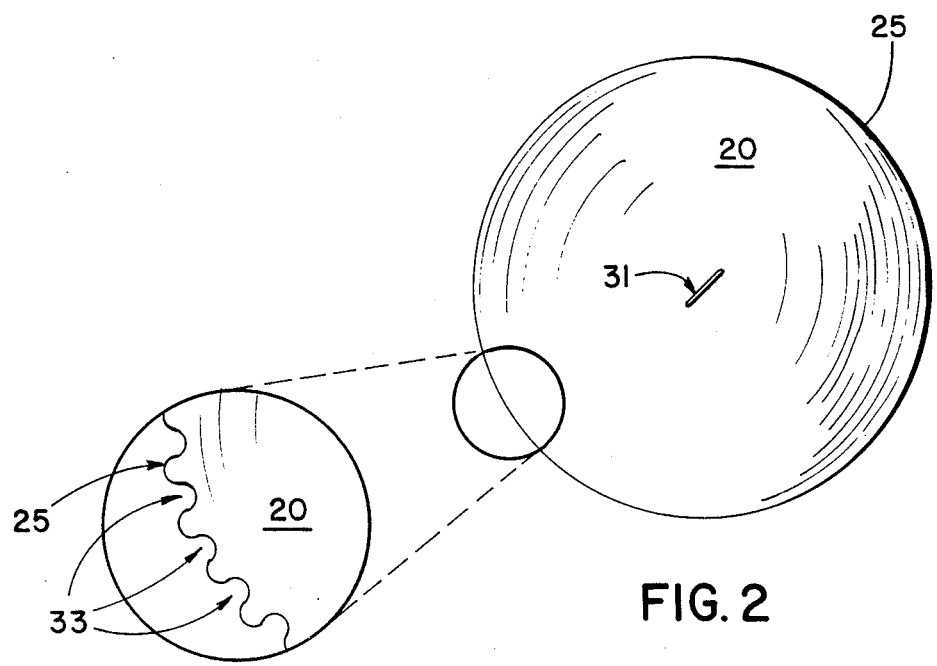
FIG. 2 shows a top view of one of the disk with an enlarged section of the disk showing an irregular edge.

Disk 20 as shown in FIG. 1 comprises a concave shape (as viewed from above the water) which may have a diameter of 6 feet and includes a serrated edge 25 as better shown in FIG. 2. The concave shape of disk 20, 21 and 22 allows device 10 to pass straight down when dropped into the water and prevents device 10 from planing from side to side as it descends to the lake bed below. Disk 20 may be formed from a floatable, light-weight plastic material such as polyethlene or other plastic having a density less than water and may have a thickness of ⅛ to ⅜ inches. Edge 25 is shown in FIG. 2 as being serrated but may be scalloped or have another non-uniform shape but preferably not smooth in order to catch fishing line 26 in one of the notches 33 as seen in FIG. 1 to hold it on device 10 and close to game fish 35 that might gather under disks 20, 21 or 22. As understood, disks 20, 21 and 22 may all be the same size or can vary and serve as shelter or shade for bass, crappie and other fish. Buoy 27 acts as a marker and is attached to upper disk 22 by flexible nylon cord 28. As would be understood, buoy 27 may be removed from disk 22 and device 10 can then be left in the water if desired by the owner without other fishermen knowing the exact location of device 10. Connector loops 390 and 31 are shown in FIG. 3 on opposit4e sides of disk 20 and serve to engage connectors 14 which may be made of ⅛ inch stainless steel wire, plastic or other suitable materials which will prevent substantial rotation of disk 20 as it remains affixed to anchor means 11. If in the event disk 20 rotates substantially in use, fishing line 26 of course would be wrapped around the device and entangle or would be prematurely released therefrom. Disk 21 and 22 may also have serrated edges and all concave in shape though as seen in FIG. 1 have diameters less than disk 20.

In another embodiment device 40 is shown in FIG. 5 with only one disk 20 utilized and would be beneficial in a relatively shallow lake or pond when positioned on lake bottom 40.

The illustrations and examples provided herein are for explanatory purposes of the invention and are not intended to limit the scope of the appended claims.

I claim:

1. A device for attracting fish comprising: a disk, said disk having an upward concave shape when positioned in the water, anchor means, said disk joined to said anchor means, said anchor means for limiting the movement of said disk.

2. A device as claimed in claim 1 wherein said disk has an irregular edge.

3. A device as claimed in claim 2 wherein said disk has a serrated edge.

4. A device as claimed in claim 1 wherein said disk is formed from plastic.

5. A device as claimed in claim 1 wherein said disk has a concave configuration.

6. A device as claimed in claim 1 wherein said disk is formed from a floatable material.

7. A device as claimed in claim 1 wherein said anchor means comprises a compartment for containing bait fish.

8. A device as claimed in claim 1 wherein said anchor means comprises a tubular member, a removable lid, said lid attached to said tubular member, said tubular member having walls defining a plurality of openings, a weight, said weight positioned in said tubular member.

9. A device as claimed in claim 1 wherein said disk is formed from polyethylene.

10. A device for attracting fish comprising: a first disk, said first disk having an upward concave configuration and an irregular edge, anchor means, said anchor means including a container for bait fish, connector means, said connector means joined to said first disk and to said anchor means.

11. A device as claimed in claim 10 wherein said connector means is rigid.

12. A device as claimed in claim 10 and including a second disk, said second disk joined to said first disk.

13. A device as claimed in claim 12 and wherein a third disk, said third disk joined to said second disk.

14. A device as claimed in claim 13 and including a removable buoy, said buoy attached to said third disk.

15. A device as claimed in claim 10 wherein said first disk is formed from a transparent plastic.

16. A device as claimed in claim 10 wherein said disk having an irregular edge.

17. A component as claimed in claim 16 wherein said irregular edge is serrated.

* * * * *